INVENTORS
John Henry Harris Davis, Raymond Alec Butcher, Maurice Exwood
By Richard [illegible]
Agt INVENTORS
John Henry Harris Davis, Raymond Alec Butcher, Maurice Exwood
By [signature]
Agt INVENTORS
John Henry Harris Davis, Raymond Alec Butcher, Maurice Exwood
By Richard ... Agt INVENTORS
John Henry Harris Davis, Raymond Alec Butcher, Maurice Exwood
By Richard [illegible]
Agt 3,249,689

TELEVISION DISTRIBUTING SYSTEM HAVING LATCHING PROGRAM SELECTOR AND DEBITING RELEASE SIGNAL

John Henry Harris Davis, London, Raymond Alec Butcher, Surrey, and Maurice Exwood, Ewell Surrey, England, assignors to R & R Research Limited Filed June 21, 1962, Ser. No. 204,098
Claims priority, application Great Britain, June 27, 1961, 23,245/61
24 Claims. (Cl. 178—6)

Figure 1:
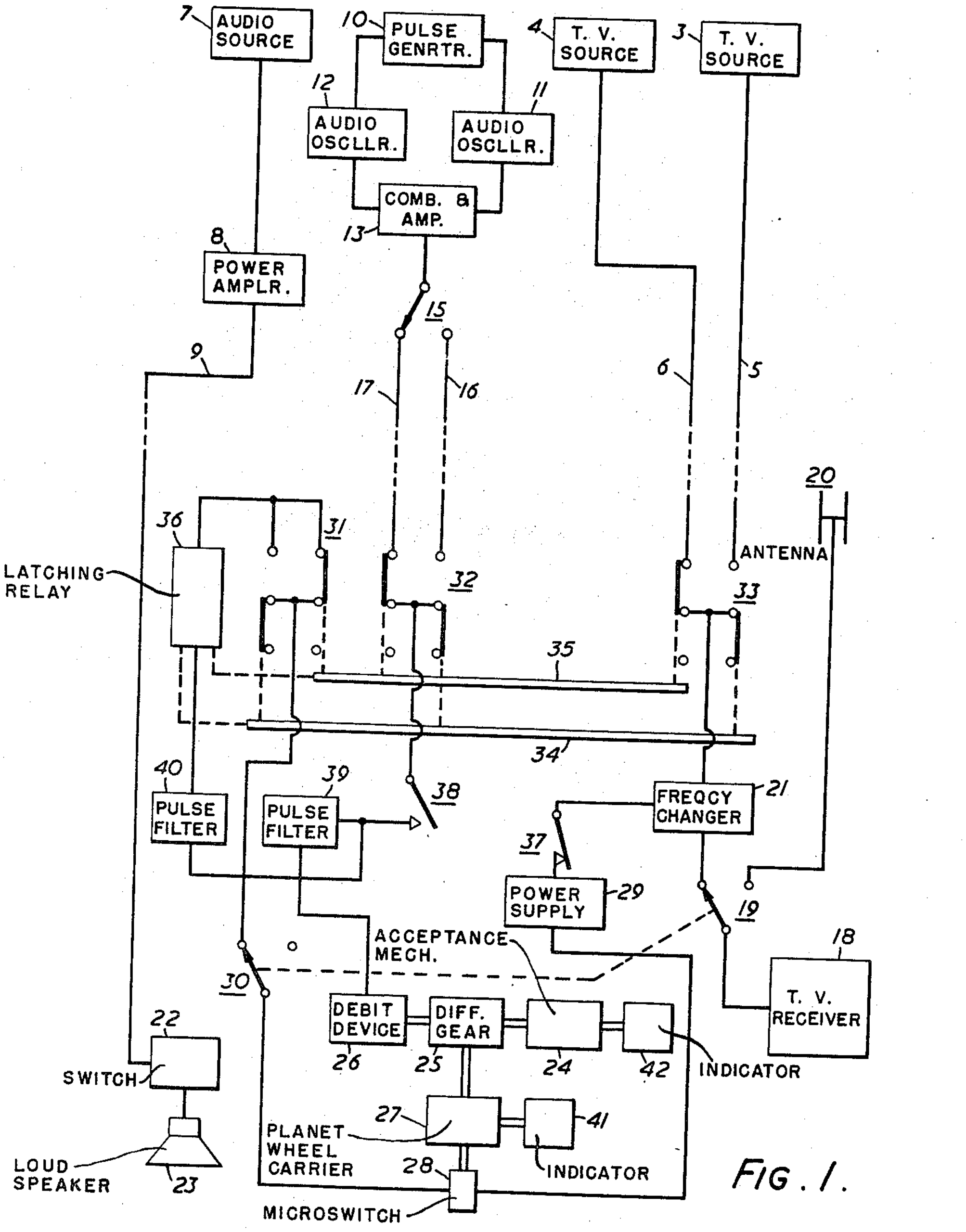

This invention is concerned with broadcasting systems of either the wire or wireless kind in which a receiving equipment for the broadcast transmission is arranged under the control of apparatus whereby the user of this equipment can be called upon to make payment in respect of programme features. Such systems, which hereinafter will be referred to as pay-type broadcasting systems, include for example television systems in which a receiving equipment, destined to receive the picture transmission with or without its accompanying sound or in some cases the accompanying sound only, incorporates or has otherwise associated therewith a debit registering device whereby the user of the equipment can be called upon to pay for the satisfactory reception of programme features. Such debit registering device can comprise a coin-accepting apparatus, which enables a user of this equipment to obtain satisfactory reception of particular programme features only when a demand for a specific fee has been satisfied, or alternatively means operating to register the fees in respect of those programme features which are satisfactorily received so that the recepient thereof subsequently can be billed for these fees.

In some such pay-type broadcasting systems as have hitherto been proposed a coded electric signal, which is indicative of the price being requested for a particular programme feature has been transmitted throughout the duration of the feature to cause coin-accepting apparatus to establish a demand for a specific fee and to enable the user of a receiving equipment to begin to accept the feature at any time during its transmission, but such apparatus tends to be unduly complicated and expensive to produce.

An object of the present invention is to provide improved pay-type broadcasting systems which afford facilities for the organiser of the system to charge recipients of the service different fees for different programme features and permit the recipient to accept the service at any time during the transmission of a programme feature through the intermediary of apparatus which is comparatively simple and cheap to produce.

Another object of the invention is effectively to charge a specific fee for a program after or during a subscriber's reception of the program, and to prevent the subscriber's evading payment by switching off his receiver after reproducing some of a chargeable item.

Yet another object of the invention is to charge fees for programs without the expense of transmitting them in scrambled form.

It is to be understood that the word "coin" when used herein not only means a real coin but also a disc, token or any other device which is representative of and can be used in lieu of a real coin in the coin-accepting apparatus concerned.

Broadly, according to the present invention, there is provided a pay-type broadcasting system in which the transmitting apparatus includes signal generating and transmitting means serving to produce in the signal transmission medium of the system and in succession a first electric signal which pertains to a programme feature, a second electric signal which pertains to a debiting operation and is representative of the price which is being charged for this particular programme feature and a third electric signal which pertains to a latch-releasing operation, and in which the receiving equipment includes a personally operable device which can be actuated from a first position to a second position by the user of the equipment and when in said second position enables this equipment to receive said first, second and third electric signals, transducing means responsive to said first electric signal to reproduce the programme feature to which said first electric signal pertains, a debit registering means which is responsive to said second electric signal to register the price being charged for this particular programme feature, a latching means which is operative when said personally operable device is in the second position to retain this device in this second position pending the transmission of the said second electric signal, and latch-releasing means operative in response to said third electric signal to render said latch temporarily ineffective and permit the return of said device to its first position.

For the purpose of the following description it is deemed convenient to refer to said first, second and third signals as the programme signal, the debiting signal and the latch-releasing signal respectively.

In those embodiments of the invention in which the debit registering means is arranged in association with a coin-accepting apparatus, the arrangement can be such that this apparatus actually or in effect permits the accumulation of a monetary deposit having a value which is not less than the predetermined maximum individual fee which is to be collected. The debit registering means in this case is a movable element arranged and adapted to be advanced by the operation of this coin-accepting apparatus and to be retracted by an electro-mechanical device which operates in response to the application thereto of the debiting signal. This advancing and retracting of the movable element is made in a manner such that the position of the element is at all times representative of the prevailing debit/credit condition. A first electric switching means is arranged under the control of this movable element and a further electric switching means is arranged as a personally operable device destined to be operated by a user of the receiving equipment to signify the user's acceptance of a particular programme feature. These switching means jointly control modification of the condition of the receiving equipment from a normal condition, for which satisfactory reception of a programme feature is not possible, to a condition for which such reception is possible and also the modification of the condition of the electro-mechanical device from a normal condition, for which it does not respond to the debiting signal, to a condition for which it does respond to said signal, the arrangement being such that these modifications of the conditions of the receiving equipment and the electro-mechanical device can take place only when the movable element is occupying a position which corresponds to a predetermined debit/credit condition and the further switching means has been operated to signify the user's acceptance of a particular programme feature. A circuit latching means is provided to ensure that the electro-mechanical device will continue to be operative in response to the debiting signal pending the transmission of the latch-releasing signal which has for effect to restore the receiving equipment and the electro-mechanical device to their respective normal conditions.

An important aspect of such a coin-controlled system is the fact that the conditioning of the receiving equipment, in order to receive satisfactorily a programme feature, is made dependent upon said movable element occupying a predetermined position so that at least in effect it is possible to arrange that such conditioning of the receiving equipment is dependent upon there being a deposit in the coin-accepting apparatus which is at least sufficient to meet the maximum charge to be requested for any particular programme feature. The establishment of this minimum monetary deposit can be achieved either by actually inserting sufficient coinage into the apparatus when it is first installed in the users premises or, more conveniently, by initially setting the movable element of the registering means to the predetermined position which is representative of said deposit.

By arranging for the debiting signal to have any one of a plurality of different predetermined forms, such for example as predetermined different numbers of pulses, the debit registering means responsive thereto can be made to register any one of a plurality of different charges, thereby enabling the organiser of the system to charge any one of a plurality of different fees for any given programme feature by appropriate modification of the debiting signal. In this simple and expedient way the complicated procedure hitherto adopted in some pay-type broadcasting systems of reconciling the value of the coinage inserted into a coin-accepting apparatus with the value of the fee being demanded is avoided.

A feature of the invention is a latching arrangement to prevent the subscriber switching off his receiver until he is charged for the program he is receiving.

A further feature of the invention is the transmission of a latch-releasing signal after debit signals are transmitted to enable the subscriber to switch his receiver off, or alternatively actually to switch the receiver off, at the end of the program.

A further feature of the invention is to transmission of a fee-denotive number of short, debiting pulses followed by a long, latch-releasing pulse.

Figure 2:
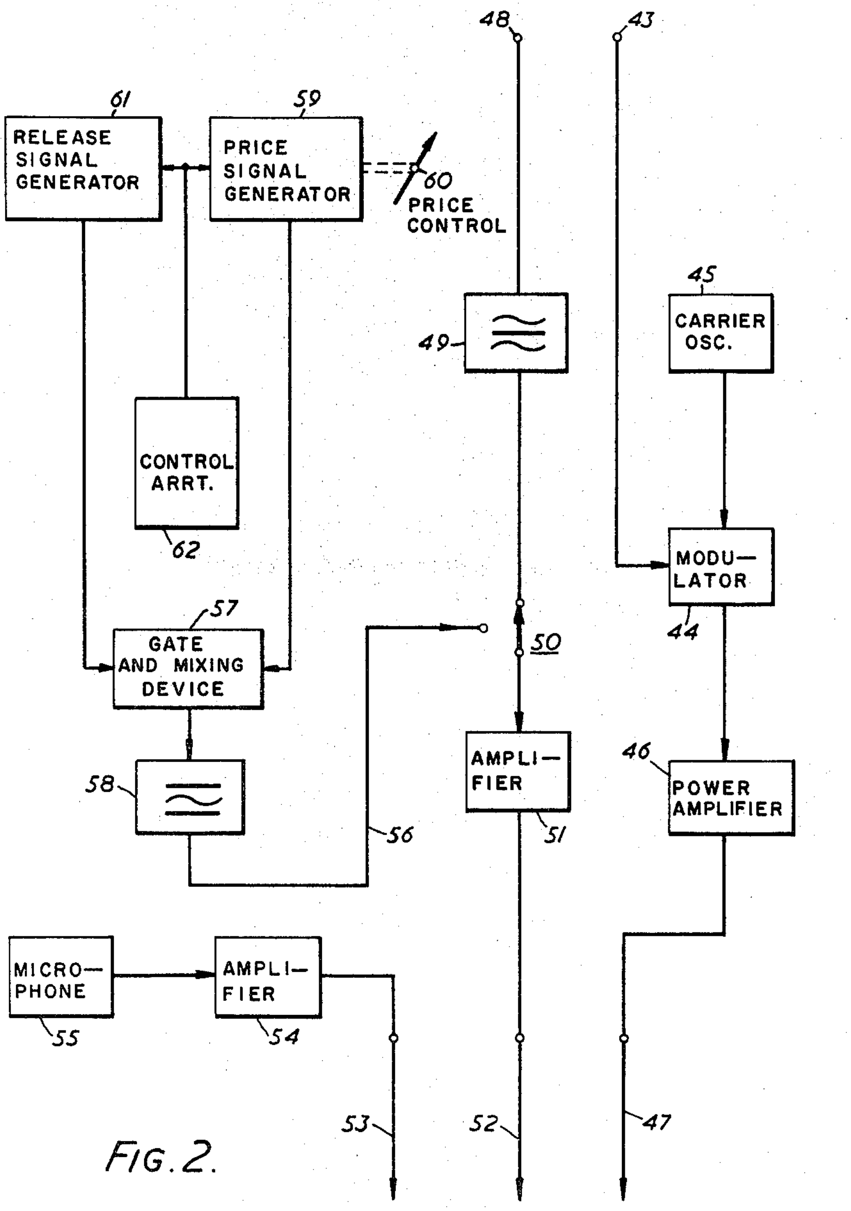
Figure 3:
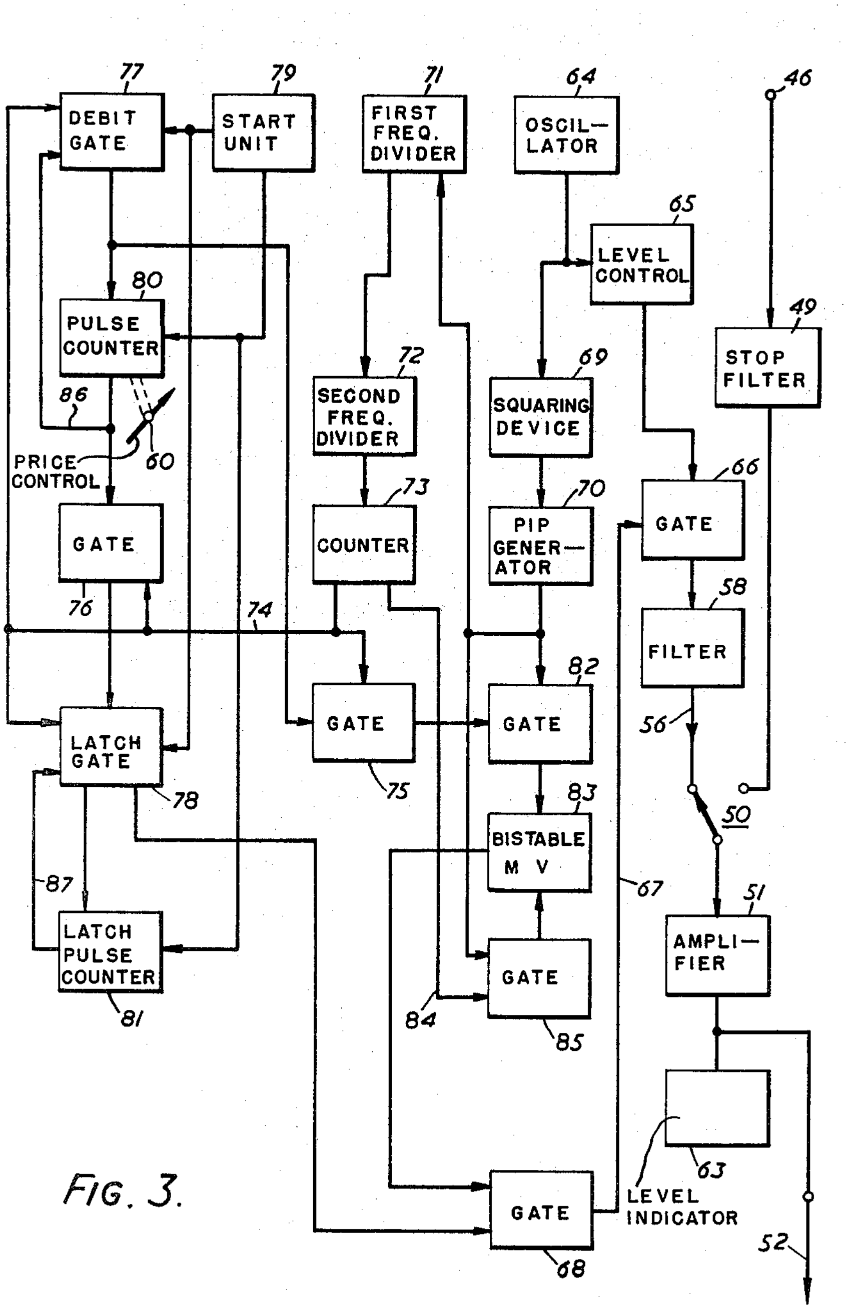
Figure 4:
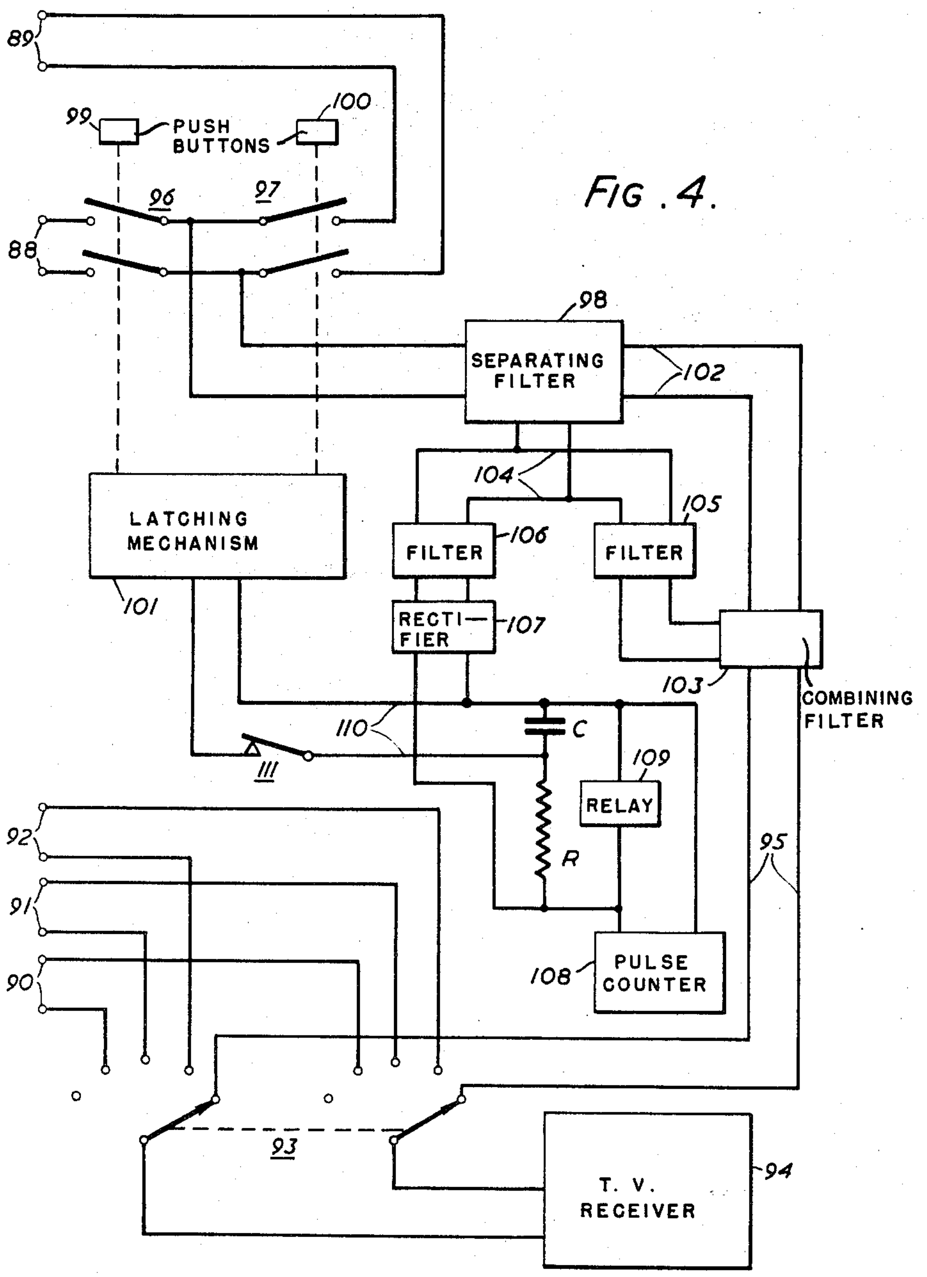

In order that the invention more readily can be understood, some preferred embodiments thereof will now be described, merely by way of example, with reference to the accompanying drawings in which:

FIG. 1 shows, in diagrammatic manner, components of the transmitting station equipment and of a typical receiving station equipment of a wired broadcasting system according to one embodiment of the invention, FIG. 2 shows, in similar manner, components of an alternative form of transmitting station equipment for such a system, FIG. 3 shows, in similar manner but in greater detail, portions of the equipment shown in FIG. 2 and, FIG. 4 shows, in similar manner, components of a modified embodiment of a receiving station equipment for such a system.

The particular embodiment of the invention shown in FIG. 1 provides for the simultaneous distribution of carrier wave signals pertaining to two pay-television programmes, the facility for the organiser of the system to charge any one of a range of different prices for the reception of features of either programme and, at each receiving station, facilities whereby the user of a standard domestic type television receiver can accept at will any feature of either of these programmes and pay, for so doing, the fee which the organiser requests for the particular feature. The components of the transmitting station of this system comprise a source 3 of a carrier wave signal which is modulated in respect of a first television programme and a source 4 of a carrier wave signal which is modulated in respect of a second television programme, these first and second programme signals being applied to lines 5 and 6 respectively of the cable network which forms the signal transmission medium of the system. The carrier waves involved have frequencies other than those to which a standard domestic type television receiver can be tuned, for example frequencies within the range of 4–10mc./s. To enable an operator at this station to make announcements to potential viewers regarding the programme features and in particular to enable the operator to notify potential viewers of the fee which will be charged if any particular programme feature is accepted, the station includes a microphone or other source 7 of audio frequency signals and a power amplifier 8 for these signals. The audio frequency output from this amplifier is applied to a line 9 of the cable network.

A pulse generator 10 is provided for the purpose of producing, with the aid of audio frequency oscillators 11 and 12, pulses of audio frequency oscillations which are destined to effect a control over certain equipment at the receiving stations as will hereinafter be explained. Although any suitable form of pulse generating device could be adopted for this purpose, it is thought to be most convenient and economical to use a simple arrangement which comprises a rotatable disc (or drum) carrying protruding elements which, during rotation of the disc are adapted to actuate micro-switches. One such micro-switch is provided in respect of the audio frequency oscillator 11 and, during rotation of the disc, protruding pegs operate this switch to key this oscillator and thereby produce short pulses of audio frequency oscillations which are used as debiting signals in the manner hereinafter to be described. These short pulses after being passed through a signal combiner and amplifier 13 can be applied by a switch 15 to either of two lines 16 and 17 of the cable network, these lines being control signal lines for the first and second programmes respectively.

Another micro-switch pertains to the audio frequency oscillator 12 and is adapted to be operated by a protruding plate on the rotatable disc (or drum) in order to cause this oscillator to produce a comparatively long pulse which is used as the latch-releasing signal for returning receiving station equipments to their normal condition at the end of a programme feature and after the debiting signal has been transmitted. The latch-releasing signal is passed to the combiner and amplifier 13 for application, by the switch 15, to either of the control signal lines 16–17.

Although not really necessary it might be found more convenient if this group (10, 11, 12 and 13) of pulse generating elements is duplicated so that there is a separate group of such elements in respect of each programme, in which case the switch 15 can be dispensed with as each such group can be permanently connected to a separate one of the control lines 16 and 17.

The components of the receiving station shown in FIG. 1 include a standard domestic type television receiver 18 and a switch 19 whereby a user of this receiver can connect its input circuit to an aerial 20 for the purpose of receiving radiated television transmissions. Alternatively, the user can set the switch 19 into a position, as shown, for which the input circuit of the receiver 18 is connected to a frequency-changer 21, which serves to change the frequencies of the carrier wave signals pertaining to the pay-television programmes to frequencies to which the standard receiver 18 can be tuned; the receiver not being capable of receiving the pay-television programmes directly. In so far as the reception of the pay-television programmes is concerned the frequency changer 21 is a part of the television receiving equipment of the receiving station and is adapted to be conditioned for the reception of these programmes under the control of a coin-accepting apparatus.

Line 9 of the cable network is connected by way of a combined switch and volume control 22 to a loudspeaker 23 to enable the user of the receiver 18 to accept, free of charge, the announcements originating from the transmitting station in respect of the pay-television programmes, including in particular the charges to be made for the individual features of these programmes.

Much of the mechanism involved in the coin-accepting apparatus is of a kind well known and therefore it seems sufficient for the present purpose to refer merely to features of this apparatus which will assist in a proper understanding of the invention. This coin-accepting apparatus comprises a coin shute itno which sixpences, shillings or florins can be inserted, a coin-denomination testing mechanism, a shaft by the manual rotation of which each inserted coin is accepted, and a differential gear. The latter comprises opposed crown wheels and an interposed planet wheel. One crown wheel is adapted to be driven by the rotation of the coin-acceptance shaft by amounts which are representative of the value of the coin involved and the second crown wheel is adapted to be driven by a solenoid-operated ratchet in response to the application to this solenoid of the debiting signal originated at the transmitting station. The arrangement of this differential gear is such that the carrier for the planet wheel constitutes a movable element which is advanced by the operation of the coin-accepting apparatus and is retracted by the solenoid-operated ratchet. Furthermore, this movable element constitutes a debit-registering means the angular position of which is at all times representative of the prevailing value of the monetary deposit resulting from acceptance of coins by the apparatus and reduction by the operation of the said ratchet in response to debiting signals. The planet carrier is mounted upon a shaft to which there is fixed a cam for actuating a micro-switch, the formation of this cam and its angular positioning about the shaft with respect to the carrier being such that this micro-switch is "closed" only when the carrier is occupying a position which corresponds to a monetary deposit which is at least equal to the maximum individual fee which is to be collected. In the drawing (FIG. 1) these particular components of or associated with the coin-accepting apparatus are indicated in block form and consist of a coin shute and acceptance mechanism 24, a differential gear 25, a solenoid operated debiting device 26, a planet wheel carrier 27 and a cam-actuated micro-switch 28.

Other components of the receiving station will be introduced during the following description relative to the functioning thereof. Let it be assumed that the user of the receiver 18 has listened to the announcements available from the loudspeaker 23 and has thus been informed of the fee, say two-shillings, which is to be charged in respect of a particular programme feature. If now this user desires to accept this feature he sets the switch 19 to the position shown for which the input circuit of the receiver will be connected to the frequency changer 21. If because of previous use of the receiving equipment the angular position of the shaft of the planet carrier is indicative of the fact that there is no monetary deposit in the coin-accepting apparatus or that this monetary deposit is less than a predetermined maximum individual fee which is to be collected, say six-shillings, the user must insert coins into the coin-accepting apparatus and actuate the coin acceptance shaft in order to bring the deposit up to this specific minimum, at which time the cam-actuated micro-switch 28 will close. It should be noted that the feeding of coins into the apparatus at this time is payment in respect of a debit or debits incurred by the user in respect of previous programme features he has accepted and not in respect of the programme feature which he now desires to receive. The said switch 28 is arranged in series between a power supply unit 29 and a switch 30, the latter being ganged with the switch 19 so that when the switch 19 is set for the reception of pay-programme television the switch 30 connects a switch bank 31 in series with the switch 28, this switch bank 31 is one of three banks, the others being indicated at 32 and 33, which are arranged to be operated by press bars, two such bars being provided, namely a bar 34 in respect of the first television programme and a bar 35 in respect of the second television programme.

The user, having established the minimum monetary deposit, can now accept the programme feature by pressing the appropriate one of the press bars 34 or 35. Assuming the press bar 35 to be pressed, which is the condition shown on the drawing, it will be seen that the current from the power supply unit 29 can reach a latching relay 36. At the same time the input circuit of the frequency changer 21 is connected to line 6 of the cable network of the system. This energisation of the relay 36 causes one pair, 37, of its contacts to close and thereby apply power from the supply unit 29 to the frequency changer 21 so that the latter accepts the low frequency carrier wave pertaining to the programme feature and converts it to a carrier wave which is acceptable by the receiver 18 to provide satisfactory reception of the programme feature.

The operation of the press button 35 also serves to connect one of another pair of contacts 38 of the latching relay 36 to the control line 17 of the network and, as the energisation of relay 36 closes the contacts 38, signal pulses which come on to the control line 17 will be applied to pulse filters 39 and 40.

At the end of the programme feature the pulse generator 10 is started up and an appropriate number of debiting signal pulses will be applied to the line 17 and these will be effective, through the filter 39, to energise the solenoid operated ratchet mechanism 26 in order to reduce the accumulated monetary deposit by two-shillings, that is to say by the value of the fee being charged for the programme feature which has been received. This reduction of the monetary deposit will mean that the microswitch 28 will "open" but the relay 36 still remains latched until such time as the generator 10, during its cycle of operation applies to the control line 17 a latch-releasing signal pulse which is effective through the filter 40 to unlatch the relay 36. This unlatching of relay 36 brings about the reversion to normal of the press button 35 and its associated switching elements of the banks 31, 32 and 33, the opening of the contacts 37 and 38 and the termination of power supply to the frequency changer 21, with the result that the receiver 18 is no longer capable of receiving a pay-programme television feature pending the users further operation of the apparatus.

An indicator, shown in block form at 41, can be provided to indicate the amount of unused deposit. Another indicator, shown in block form at 42 can be provided to indicate the total value of the coinage which has been accepted by the coin-accepting mechanism.

If required, and in general it will be desirable, means can be provided in any of the embodiments of the invention for recording the various operations of the apparatus in order to produce a record of the various transactions and preferably such record identifies the different programme features.

In embodiments of the receiving equipment suitable for use in those circumstances where the user of the equipment prefers to pay the charges incurred on a monthly, quarterly or other long term basis, the coin-accepting mechanism can be dispensed with and a simple debit registering means, such as an impulse counter, can be arranged to be under the sole control of the debiting signals in order to register the total value of the charges incurred during such a long-term period and enable the organiser of the system to render an account to the user for this total charge. Thus the elements 24, 25, 27, 28 and 41 of the arrangement shown in FIG. 1 could be dispensed with, the switch arm of switch 30 permanently connected to the power supply 29 (instead of through the micro-switch 28) and the solenoid operated debiting device 26 used to drive a pulse counter of any desired suitable kind to register the total number of pulses to which said device responds and thereby indicate the total charges incurred by the user of the receiving equipment. In some such cases the pulse counter can be of the recording type, for example of a kind which produces a record upon a paper strip which the organiser of the system can collect and use for the purpose of rendering his account for the charges incurred.

There is shown in FIG. 2 an alternative form of transmitting station equipment for use in a wired broadcasting system according to the invention. The components of this equipment which are shown in the drawing pertain to a single pay-television programme but more than one such programme can be catered for by suitable duplication of some at least of these components. This equipment comprises an input terminal 43 to which is adapted to be applied video signals pertaining to the pay-television programme. These video signals are fed to a modulator 44 which receives a carrier wave input from a carrier oscillator 45 and feeds its modulated carrier wave output by way of a power amplifier 46 to a transmission line 47 of the wired network which constitutes the signal transmission medium of the system. Audio frequency signals pertaining to the sound accompaniment of said video signals are applied to an input terminal 48 and hence pass by way of a stop filter 49 to a two-position switch 50, one position of which, as shown, feeds these sound signals to an amplifier 51 for subsequent application to a transmission line 52 of the wire network. The stop filter 49 is designed to attenuate components of the sound signals which have a predetermined frequency, for example in the present case a frequency of 80 cps. or thereabouts, in order to prevent false operation of debit registering and latch-releasing means as will hereinafter be referred to. Another transmission line, 53, of this network is adapted to carry audio frequency signals which pertain to announcements concerning programme features, such as price information, and are obtained from an amplifier 54 and microphone device 55.

The required debiting and latch-releasing signals are passed to the subscribers equipments over the line 52 and are in the form of low-frequency alternating current signals. The switch 50 enables the amplifier 51 and network line 52 to convey either the sound signals from the input terminal 48 or to convey debiting and latch-releasing signals from a line 56. These latter signals are derived from a signal gate and mixing device 57 through a band pass filter 58 which minimises spurious components, produced during the formation of these signals, from being applied to the network line 52.

The debiting signals are generated in a price signal generator 59 which provides short pulses of alternating current at a frequency of approximately 80 cps. Each pulse has a duration of approximately 100 ms. and represents a unit of charge, preferably a fraction of the minimum charge to be made for a programme feature, so that a plurality of such pulses have to be sent to debit a subscriber even with the minimum charge. Conveniently two pulses per second are transmitted so that the spacing between successive pulses is 400 ms. Adjustment of the generator 59 for different price debiting signals is made by a manual price-setting control 60.

The latch-releasing signals are generated in a latch-release signal generator 61 which provides a long pulse, having a duration of approximately 20 seconds, of alternating current at a frequency of approximately 80 cps. These generators 59 and 61 are mechanically interlinked by an automatic control arrangement 62 which ensures that the generator 61 produces a latch-releasing pulse only after the generator 59 has produced a charging signal.

These arrangements are shown in greater detail in FIG. 3 where the switch 50 is in its second position for which the power amplifier 51 feeds the network line 52 with signals from the line 56. The amplitude of the signals on the network line 52 is indicated by a level indicator 63.

The debiting and latch-releasing signals are derived from a common alternating current source in the form of an oscillator 64 which produces an alternating current signal having a frequency of approximately 80 cps. This signal is destined to be fed by way of a level controller 65, a signal gate 66 and filter 58 to the amplifier 51. Normally the gate 66 is closed to prevent the passage of this signal and is adapted to be opened, to pass this signal by a gating signal which is applied to it over a line 67 from a gate 68. This gating signal consists of pulses of 100 ms. duration, having a repetition frequency of two pulses per second, which control the gate 66 to produce 100 ms. bursts of the 80 cps. signal to form the debiting signals or of a single pulse of 20 seconds duration to likewise form a 20 second burst of the 80 cps. signal to form the latch-releasing signal. These gating signals from the gate 68 are formed as follows.

The 100 ms. pulses at two pulses per second are derived from the 80 cps. oscillator 64 by frequency division. Part of the output of this oscillator is fed to a squaring device 69, the square wave output of which is differentiated by a pip generator 70 to provide short pulses at a frequency of 80 cps. These short pulses are applied to a first frequency divider 71 which provides output pulses at a frequency of half that of its input and these half-frequency pulses are then applied to a second frequency divider 72 which provides output pulses at a frequency of one quarter that of its input. The resulting pulses at 10 cps. are then applied to a ten-element dekatron counter 73 which is thus arranged to cycle once each second. The fifth and tenth electrodes of this dekatron counter are arranged to provide output pulses each time they are energised thus producing two pulses each second which are applied by the line 74 to the gates 75 and 76, a "debit" gate 77 and a "latch" gate 78. Other elements of this arrangement will be referred to during the following description of how it serves to ensure automatically the transmission of a debiting signal before the transmission of a latch-releasing signal.

When, at the conclusion of a programme feature, the organiser desires to transmit a debiting signal for the purpose of charging the users of receiving equipments for this particular feature and assuming that the price-setting control 60 has been adjusted according to the charge to be made for this particular feature, a manually operable "start" control unit 79 is actuated and this control unit is arranged and adapted to apply opening signals to the debit gate 77 and the latch gate 78 and to reset, after they have been used in respect of a previous programme feature, a price pulse counter 80 and a latch pulse counter 81, each of which can be a dekatron type unit. At first only the debit gate 77 is fully effective to pass the two-per-second pulses it receives from the line 74 and this it does to apply them to the price pulse counter 80 and the gate 75. The simultaneous application to this gate 75 of these pulses and the pulses on the line 74 produces from gate 75 an output which is applied to a gate 82 which, in response to the simultaneous application thereto of a signal from the pip generator 70, provides an output signal for conditioning a bistable multivibrator 83 to one of its stable states for which it provides an output for opening the gate 68 and hence the opening of the signal gate 66. To ensure that this multivibrator returns to its other stable state in the absence of the signal from the gate 82, the dekatron counter 73 is arranged to provide on a line 84 a signal which is present when the signal on the line 74 is absent. The signal on the line 84 therefore consists of two pulses per second, each pulse having a duration of 400 ms. and being spaced from the preceding pulse by 100 ms. These 400 ms. pulses together with an output from the pip generator 70 are applied to a gate 85 which provides an output signal to return the multivibrator 83 to said other state. Thus as long as the debit gate 77 is open the signal gate 66 will continue to apply to the network line 52 every second two short pulses of a 80 cps. wave, these pulses constituting the debiting signal to which the debit registering means of a receiving equipment of the system is arranged and adapted to be responsive. The pulses received by the debit pulse counter 80 from the debit gate 77 are counted until the number so counted corresponds with the setting of the price control 60 whereupon the counter provides an output signal on a line 86 which, upon being applied to the debit gate 77 closes this gate and thus terminates the transmission of the debiting signal. The signal produced on the line 86, when the price pulse counter 80 completes its count, in addition to closing the debit gate 77 is also applied to the gate 76 where, in conjunction with the pulses being applied thereto from the line 74, it serves to produce a signal for opening the latch gate 78 to pass pulses to the gate 68 in respect of the latch-releasing signal. This results in the opening of the gate 68 which in turn opens the signal gate 66 and as long as the latch gate 78 remains open an 80 cps. wave will be applied to the network line 52 to function as a latch-releasing signal to which a latch-releasing device of the receiving equipments of the system is arranged and adapted to be responsive.

Pulses from the line 74 are also passed by the latch gate 78 to the latch pulse counter 81 and when the latter has counted such pulses up to a number which corresponds to a period of 20 seconds, which is the allotted duration of the latch-releasing signal in this case, this counter is arranged and adapted to provide a signal on a line 87 which is applied to the latch gate 78, closes this latch gate to the passage of further pulse signals from the line 74 and therefore terminates the transmission of the latch-releasing signal over the line 52 of the network.

The gates 77 and 78 will now remain closed pending a further actuation of the start control unit 79 to initiate a similar sequence of operations at the end of the next pay-programme feature.

As the debiting and latch releasing signals are in this embodiment alternating current signals, the receiving equipments must obviously include rectifying means if the debit registering means and the latch-releasing means are arranged to be D.C. operated.

In the foregoing embodiments of the invention, the signals pertaining to the debiting and latch-releasing have been transmitted over separate lines of a wire line network of the system, but it is to be understood that other arrangements are possible within the scope of the invention and in particular that in some transmitting arrangements all these signals can be fed into a single line of such a network. This is a particularly convenient form of the invention if the television receivers at the receiving stations of the system are of a type which is specifically adapted for receiving the sound accompaniment of the television pictures as an audio frequency wave transmission. Components of such a receiving station according to a modified embodiment of the invention are shown in FIG. 4. This station is arranged and adapted for receiving either one of two pay-television programmes and either one of two free television programmes, that is to say television programmes for the reception of features of which no specific charge is made. Two pairs of terminals, 88 and 89, are provided for connection to the two separate lines respectively of a wire line network of the broadcasting system, each of these lines pertaining to a separate pay-television programme. Two further pairs of terminals, 90 and 91 are provided for connection to two further separate lines of the network, each of these further lines pertaining to a separate free television programme. Another pair of terminals, 92, is provided for connection to a further separate line of the network, this latter line being reserved for the purpose of transmitting, as audio frequency signals, information such as the price of the pay-programme features. A double-pole manually operable switch 93 is provided to enable the user of this equipment to select to receive either a free programme feature or a pay-programme feature, this switch serving to connect a television receiver 94 to either of the terminal pairs 90 or 91 for reception of a free programme, to the terminal pair 92 in order to receive information concerning the pay-programmes or to leads 95 for obtaining reception of a pay-programme feature.

The picture signals of each of the television programmes are transmitted over their respective lines of the network as modulations of high frequency carrier waves and the accompanying sound signals are transmitted over the same respective lines at audio frequencies in a manner well known in the art of wired broadcasting. Therefore, the receiver 94 is of a kind, also known in the art of wired broadcasting, in which filter means are provided for channelling the high frequency carrier waves to the picture reproducing apparatus and for channelling the said audio frequency sound signals to a loudspeaker which forms part of the receiver. Accordingly and assuming that the receiver is already being energised from a power supply main or other suitable equivalent source of electric power, if the switch 93 is set to connect the receiver 94 to terminal pair 90 or 91 the receiver will reproduce the available free programme. On the contrary, if the user of this equipment, having for example first of all used the switch 93 to receive information concerning a pay-programme feature, desires to receive such latter feature he must not only set the switch 93 to connect the receiver to the leads 94 but must also actuate the personally-operable means whereby the particular pay-programme feature will be accepted and the charge therefor duly incurred. Two such personally-operable means are provided in this case, one in respect of each of the two pay-programmes, and comprise press button switches 96 and 97 whereby a separating filter 98 can be connected to either one of the terminal pairs 88 or 89 respectively. The switches 96 and 97 are of a known type in which their respective push buttons 99 and 100 are interlocked so as to prevent more than one of these being brought into an operated position at any one time. These push buttons are further controlled by an electro-magnetic latching mechanism 101 as hereinafter described.

Further components of this equipment will be introduced during the following description relative to the use thereof. Let it be assumed that the user of the equipment desires to receive a pay-programme feature which is available on the line of the network to which the terminals 88 are connected and that the switch 93 has already been set to connect the energised receiver 94 to the leads 95. The user now pushes the button 99 to close the switch 96 and thereby connect the filter 98 to the terminal pair 88 and therefore to the network line upon which the wanted programme feature is available. The push button 99 automatically is latched in this operated position by the latching mechanism 101 and moreover the user is prevented from likewise operating the other push button 100 pertaining to the other pay-programme until in due course the latching mechanism is operated, in response to the transmission of a latch-releasing signal, to release the button 99.

The separating filter 98 is a passive impedance network which separates the audio frequency signals fed thereto from the high frequency picture signals also fed thereto. Said picture signals are passed by way of leads 102 to a complementary combining filter 103 the output from which is applied to the leads 95 and hence by way of switch 93 to the receiver 94. The audio frequency output from the separating filter 98 is available across the leads 104 and comprises the audio frequency signals pertaining to the sound accompaniment for the picture signals and any debiting or latch-releasing signal which might be present in the network line. Assuming that the transmitting station equipment transmits these debiting signals as short pulses of say 80 cps. waves and the latch-releasing signal has a long pulse of similar waves (as provided for in the equipment hereinbefore described with reference to FIGS. 2 and 3) the filter 105 serves to attenuate these 80 cps. signals whilst allowing the audio frequency sound signals to pass to the combining filter 103 with relatively little attenuation. These sound signals are included in the output of the filter 103 and pass to the receiver 94 to operate the loudspeaker thereof.

The filter 106 is designed to attenuate severely those audio frequencies other than the 80 cps. waves which, as pulses of such waves, it passes on to a rectifier 107. For each of these pulses the rectifier 107 produces a corresponding pulse of direct current which is applied to a debit registering means which comprises an electromagnetically driven ratchet type pulse counter 108 of any suitable kind which is responsive to the short D.C. pulses applied thereto and thereby registers the total value of the charges incurred by the user of the equipment in respect of his reception of pay-programme features. The winding of a relay 109 is also connected across the output of the rectifier 107 and is likewise energised by the D.C. pulses available from this rectifier.

Also across the output of this rectifier 107 is an integrating network which comprises a resistance R in series with a capacitance C. A solenoid of the latching mechanism 101 is connected, by leads 110 and switching contacts 111 of the relay 109, across the capacitance C. Suitable energisation of this solenoid is adapted to release the push button (in this case 99) which the latching mechanism is retaining in operated position. When the relay 109 is energised by a pulse from the rectifier the contacts 111 open to disconnect the solenoid of the latching mechanism 101 from across the capacitance C and therefore this capacitance becomes charged to an extent which is related to the duration of the pulse. The time constant of the integrating network RC is such that the debiting signals, being the pulses of short duration, are insufficient to charge the capacitor C, during the time the contacts 111 are open, to an extent which, when said contacts close again, is sufficient to cause satisfactory energisation of the solenoid of the latching mechanism 101. Accordingly, the latching mechanism continues to latch the push button 99 throughout the time that the debiting signals are being received and used for registering the cost of the programme feature. When after such debit registering has taken place the latch-releasing signal is received, the rectifier produces from this a direct current pulse of much longer duration and, when contacts 111 close, the charge in C is sufficient to produce satisfactory energisation of the solenoid of the latching mechanism 101 and cause the release of the push button 99. The receiving equipment is now in a condition to enable the user thereof either to accept another pay-programme feature, in which case a similar sequence of operations will take place, or the user can operate the switch 93 to receive a free programme.

In some cases the debit-registering pulse counter 108 can be of the recording type, such for example as one which produces a record upon a paper strip which the organiser of the system can collect from the user in order to enable him to render his account to the user for the charges incurred. Further, in other cases the debit registering device can be arranged in association with a coin-accepting apparatus such for example as in the manner hereinbefore described with reference to FIG. 1 of the accompanying drawings.

It is to be understood that the invention also can be put into practice in radio broadcasting systems, as distinct from the wired form of such systems more particularly described, in which case the debiting signals and the latch releasing signals can be transmitted over a wire line network such for example as an existing wired broadcasting network or a telephone service network. In such a case and in order to guard against fraudulent reception of pay-programme features, that is to say reception of such features without incurring the proper charge therefor, it is preferable to scramble the programme signal for transmission as a scrambled signal and provide the receiving equipments of the system with facilities for unscrambling the received signal.

In addition to the debiting signal and the latch-releasing signal, other control signals may be transmitted to the receiving equipments of the system, for example one such control signal may be transmitted for the purpose of indicating to a user who desires to accept a forthcoming programme feature that the programme feature presently available on the system is nearing its conclusion. Such an indication will minimise the likelihood of the user of a receiving equipment actuating his mechanism just prior to the conclusion of the preceding feature and thereby receiving debiting signals which pertain to said previous feature.

Such broadcasting systems can also incorporate apparatus whereby the organiser of the system is presented with an indication of the number of receiving equipments which are accepting or have accepted any particular programme feature.

Although in the foregoing particular description the systems and apparatus have pertained primarily to television, it is to be understood that such systems are equally well adapted for use in connection with sound only programmes if it is desired to charge the recipient thereof for particular features of such programmes.

What we claim is:

1. In a pay type broadcast system, equipment at a transmitter station comprising means to generate and transmit (a) a program signal in respect of at least part of a program for reproduction for a fee at a cooperating receiver station, (b) a debiting signal near the end of said program being a single representation of the fee, and (c) a latch-releasing signal after transmission of said debiting signal for enabling equipment at the receiver station to be switched off, and equipment at the cooperating receiver station, comprising receiver means to receive said transmitted signals, means to reproduce said program from said program signal, setting means operable at will to set said means to reproduce from a non-reproducing condition to a reproducing condition, debit registering means to register a debt for said fee in response to said debiting signal, conditioning means to make a path for admitting said debiting signal for application to said debit registering means whenever said means to reproduce is set in said reproducing condition, a latching arrangement to inhibit said setting means from being operable at will from said reproducing condition to said non-reproducing condition until the advent of said latch-releasing signal, and means coupled to said setting means and responsive to said latch-releasing signal to release said setting means from the inhibiting action of said latching arrangement, whereby said debit registering means is maintained effective once a program is being received until after the debiting signal in respect of said program has been received.

2. Equipment according to claim 1, comprising means to accept monetary deposits, and means coupling said means to accept to said debit registering means, whereby said debit registering means is responsive in one sense to said debiting signal and in the opposite sense to accepted monetary deposits, to register the prevailing debit/credit condition.

3. Equipment according to claim 1 wherein said registering means comprises a movable element, means to move said element in one sense by an amount dependent on said debiting signal, the equipment further comprising means to accept monetary deposits, means coupling said means to accept to said debit registering means and responsive to successive monetary deposits in said means to accept, to move said element by successive amounts in the opposite sense, whereby the position of said element registers the prevailing debit/credit condition, and means responsive to the position of said element to render said equipment ineffective to reproduce programs when said element is displaced in the said one sense from a predetermined position.

4. Equipment according to claim 1 wherein said debiting signal comprises short pulses, the number of which are digitally denotive of said fee, and said latching-releasing signal comprises a long pulse, said receiver station comprising pulse-channelling means for distinguishing between said short and said long pulses and for channelling them to operate respectively said debit registering means and said latching-releasing means.

5. Equipment according to claim 1 comprising means coupled to said setting means and operatively responsive to said latch-releasing signal automatically to bring about said non-reproducing condition.

6. A system as in claim 5, in which said means to generate said debiting signal and said latch-releasing signal comprises a rotatable device arranged in association with a switching means which pertains to said debiting signal and a switching means which pertains to said latch-releasing signal, and means for rotating said device to actuate said switching means in a manner which ensures that the generation of a latch-releasing signal follows automatically after the generation of a debiting signal.

7. A system as in claim 5, in which said means to generate said debiting signal and said latch-releasing signal comprises an electric wave oscillator, separate electric gating circuits in respect of the debiting signal and the latch-releasing signal, and timing means for controlling the opening of said gates for producing respectively short pulses of the electric wave output from said oscillator to constitute a debiting signal and longer pulses of the electric wave output of said oscillator to constitute the latch-releasing signal.

8. A system as in claim 7, comprising personally-operable "start" control means for initially applying an opening signal to the gate pertaining to the debiting signal, and a pulse counter which serves to count pulses passed by said gate, until the number thereof corresponds to the number of such pulses which are representative of a predetermined charge for a programme feature, and then applies a closing signal to said gate.

9. A system as in claim 8, wherein said pulse counter is arranged and adapted to supply an opening signal to the gate pertaining to the latch-releasing signal simultaneously with the closing of the gate pertaining to the debiting signal.

10. A system as in claim 8, wherein the gate pertaining to the latch-releasing signal is arranged under the control of a second pulse counter which is arranged and adapted to supply a closing signal to this gate after it has been opened for a predetermined time.

11. A system as in claim 8, wherein the pulse counter includes an adjustable control which can be set to determine the number of pulses up to which it will count before said closing signal is supplied to said gate, and thereby determines that the debiting signal is representative of the charge to be made in respect of a programme feature.

12. A system as in claim 11 wherein frequency dividing means are provided for obtaining from the electric wave output of said oscillator pulses which are used to control the opening and closing of both of said gates.

13. A system as in claim 12 in which a signal-transmission medium interconnects said transmitter and receiver, said medium being formed at least in part by a wire line network to which the debiting and latch-releasing signals are applied for distribution to the receiving equipment.

14. A system as in claim 13, wherein at least one line of said network is reserved for the distribution of programme signals pertaining to television picture programmes.

15. A system as in claim 13, in which the transmitting apparatus includes means to apply a programme signal, the debiting signal and the latch-releasing signal to a common line of the network for distribution to the receiving equipment, and said receiving equipment includes discriminating means serving to channel said signals to a television picture reproducing means, a debiting means and a latch-releasing means, respectively.

16. A system as in claim 13, in which the transmitting apparatus includes means to apply audio frequency electric waves pertaining to sound signals and pulses of audio frequency electric oscillations which pertain to the debiting and latch-releasing signals to a common line of the network for distribution to the receiving equipment, and said receiving equipment includes discriminatng means to channel said audio frequency electric waves to an electro-acoustic transducer and to channel the pulses of said electric oscillations to a debiting means and a latch-releasing means.

17. A system as in claim 13, in which the receiving equipment includes personally-operable switching means to electrically connect a programme signal transducing means to a line of said network or alternatively to an antenna whereby said transducing means can receive radiated programme signals.

18. In a pay broadcast receiver, equipment comprising means to receive signals, means to reproduce a program-containing signal, personally-operable means to set said reproducing means from a non-reproducing to a reproducing condition, debit registering means responsive to a received debiting signal containing quantitatively denotive fee information to register a debit in accordance with the information, conditioning means to make an electrical path for admitting said debiting signal to operate said debit registering means whenever said means to reproduce is set in said reproducing condition, a latching arrangement to inhibit said setting means from being operable at will from said reproducing condition to said non-reproducing condition until the advent of a latch-releasing signal, and means coupled to said latching arrangement and operative on reception of said latch-releasing signal to override the inhibiting action of said latching arrangement, thereby to release said setting means from said inhibiting action, whereby said debit registering means is prevented from being rendered ineffective before the debiting signal in respect of a program being received is itself received.

19. Equipment according to claim 18 comprising means automatically to condition said setting means to the non-reproducing condition in response to the reception of said latch-releasing signal.

20. A broadcast receiving equipment as in claim 19, wherein the debit registering means is associated with a coin-accepting apparatus and comprises a device which is arranged to be advanced by the operation of said apparatus in the course of establishing a monetary deposit therein and is arranged to be retracted in response to the reception of said debiting signal for the purpose of debiting a charge against said deposit.

21. A broadcast receiving equipment as in claim 20, wherein the debit registering means comprises a movable element which is arranged to control the operation of a switch which, in conjunction with said personally-operable switching means, enables the equipment to be brought to a condition in which it will respond to programme, debiting and latch-releasing signals, a coin-accepting apparatus whereby said movable element is adapted to be advanced in the course of operating said apparatus to establish a monetary deposit therein, and means operative in response to the application thereto of a debiting signal to retract said element for the purpose of debiting a charge against said deposit in respect of a programme signal which has been received.

22. A broadcast receiving equipment as claimed in claim 21, wherein the movable member is arranged to control the switch associated therewith in such a manner that it prevents this switch from performing its allotted function of so conditioning the equipment unless said member is occupying a position which is representative of a predetermined debit/credit condition.

23. A broadcast receiving equipment as in claim 22, wherein the personally-operable switching means includes a part which is arranged to be temporarily retained in one of its two positions by an electromechanical latching device pending the application to this device of a latch-releasing signal.

24. Apparatus for receiving programs transmitted over a pay-broadcast program channel, comprising means to reproduce programs received on said channel, personally-operable means to set said reproducing means into a program-reproducing condition with respect to said channel, debit registering means responsive to a received debiting signal containing quantitatively denotive fee information to register a debit in accordance with said information, conditioning means to establish an electrical path for admitting said debiting signal to operate said debit means whenever said reproducing means is set in said reproducing condition, latch means retaining said conditioning means in said path-establishing condition, latch-releasing means coupled to said latch means, and means applying latch-releasing signals to said latch-releasing means, whereby said debiting signal path established by said conditioning means is interrupted only on receipt of said latch-releasing signal.

References Cited by the Examiner

UNITED STATES PATENTS

| | | | |
|---|---|---|---|
| 3,033,922 | 5/1962 | Campbell | 178—5.1 |
| 3,050,712 | 8/1962 | Bruck | 178—5.1 |
| 3,051,775 | 8/1962 | Novak | 178—5.1 |
| 3,071,642 | 1/1963 | Mountjoy | 178—5.1 |

DAVID G. REDINBAUGH, *Primary Examiner.*

R. M. HESSIN, *Examiner.*

H. W. BRITTON, *Assistant Examiner.*